United States Patent
Kakimoto et al.

(10) Patent No.: US 7,281,532 B2
(45) Date of Patent: Oct. 16, 2007

(54) BLOW-BY GAS AND PURGE GAS TREATING DEVICE IN INTAKE VALVE LIFT VARIABLE ENGINE

(75) Inventors: Kazuhito Kakimoto, Saitama (JP); Hisashi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 11/364,547

(22) Filed: Mar. 1, 2006

(65) Prior Publication Data

US 2006/0196482 A1    Sep. 7, 2006

(30) Foreign Application Priority Data

| Mar. 1, 2005 | (JP) | ............................ 2005-055473 |
| Mar. 1, 2005 | (JP) | ............................ 2005-055474 |

(51) Int. Cl.
*F02B 26/06* (2006.01)
*F01L 1/34* (2006.01)

(52) U.S. Cl. ...................... 123/572; 123/573; 123/516; 123/90.15

(58) Field of Classification Search ............... 123/572, 123/573, 574, 519, 520, 516, 90.15
See application file for complete search history.

(56) References Cited

U.S. PATENT DOCUMENTS

| 4,630,575 | A | * | 12/1986 | Hatamura et al. ..... 123/184.48 |
| 4,834,028 | A | * | 5/1989 | Oetting ..................... 123/41.35 |
| 5,992,397 | A | * | 11/1999 | Hideaki et al. ............. 123/538 |
| 6,123,061 | A | * | 9/2000 | Baker et al. ................ 123/573 |
| 6,457,462 | B2 | * | 10/2002 | Moren ......................... 123/572 |
| 6,659,093 | B2 | * | 12/2003 | Kim ............................ 123/572 |
| 6,848,436 | B2 | * | 2/2005 | Oota et al. .................. 123/572 |

FOREIGN PATENT DOCUMENTS

JP        2005-9487        1/2005

* cited by examiner

*Primary Examiner*—Thomas Moulis
(74) *Attorney, Agent, or Firm*—Kratz, Quintos & Hanson, LLP

(57) ABSTRACT

In an intake valve lift variable engine including: an engine body; a cylinder head; an intake valve which is disposed in the cylinder head and which is controlled to be open and close so as to regulate the amount of intake air; and an intake system having no throttle valve and connected to the cylinder head, blow-by gas is sucked from a crank case of the engine body into a first pump and pressurizingly transferred by the first pump to the side of the intake system, and purge gas from a canister is mixed into the blow-by gas pressurizingly transferred by the first pump. Thus, the blow-by gas and the purge gas are guided to the intake system.

10 Claims, 4 Drawing Sheets

BLOW-BY GAS AND PURGE GAS TREATING DEVICE IN INTAKE VALVE LIFT VARIABLE ENGINE

RELATED APPLICATION DAT

The present invention is based upon Japanese priority application Nos. 2005-55473 and 2005-55474, which are hereby incorporated in their entirety herein by reference.

BACKGROUND OF THE INVENTION

1. Field of the Invention

The present invention relates to an intake valve lift variable engine comprising: an engine body; a cylinder head; an intake valve which is disposed in the cylinder head and which is controlled to be open and close so as to regulate the amount of intake air; and an intake system having no throttle valve and connected to the cylinder head, and particularly to a device for treating blow-by gas from a crank case and purge gas purged from a canister.

2. Description of the Related Art

The Japanese Patent Application Laid-open No. 2005-9487 discloses an intake valve lift variable engine in which a throttle valve is not interposed in an intake system by regulating the amount of intake air sucked by opening/closing control of an intake valve.

In a conventional engine in which a throttle valve is provided in an intake system, a negative pressure is generated in the intake system downstream side from the throttle valve, so that it is possible to suck blow-by gas from a crank case and purge gas purged from a canister and transfer them into the intake system by using the negative pressure. Therefore, in the intake valve lift variable engine disclosed in the Japanese Patent Application Laid-open No. 2005-9487, generation of a negative pressure in the intake system can not be expected since the amount of intake air is regulated by opening/closing control of an intake valve.

SUMMARY OF THE INVENTION

The present invention has been achieved in view of the above-mentioned circumstances, and has an object to provide a blow-by gas and purge gas treating device in an intake valve lift variable engine in which a throttle valve is not interposed in an intake system by regulating the amount of intake air through opening/closing control of an intake valve so that the blow-by gas and the purge gas can be guided to the intake system.

In order to achieve the above object, in accordance with a first feature of the present invention, there is provided a blow-by gas and purge gas treating device in an intake valve lift variable engine comprising: an engine body; a cylinder head; an intake valve which is disposed in the cylinder head and which is controlled to be open and close so as to regulate the amount of intake air; and an intake system having no throttle valve and connected to the cylinder head, wherein the device comprises: a canister; a first pump for pressurizingly transferring blow-by gas to the side of the intake system, the blow-by gas being sucked into the first pump; and a second pump for immixing purge gas from a canister into the blow-by gas pressurizingly transferred by the first pump.

With the first feature of the present invention, the blow-by gas is sucked by the first pump and pressurizingly transferred to the intake system, and the purge gas is mixed by the second pump into the pressurizingly transferred blow-by gas. Therefore, even in a non-throttle operation where a negative pressure is not generated in the intake system, the blow-by gas and the purge gas can be reliably guided to the intake system, and moreover only one pipe line is provided for guiding the blow-by gas and the purge gas to the intake system, thereby simplifying the line arrangement.

According to a second feature of the present invention, in addition to the first feature, the first pump is a vane pump lubricated with oil. With the second feature, by using a vane pump lubricated with oil as the first pump, a sealing performance between a vane and a pump housing can be improved in the first pump, whereby suction/pressurizing-transfer efficiency of the blow-by gas can be improved so as to suck and pressurizingly transfer a large amount of blow-by gas.

According to a third feature of the present invention, in addition to the first or second feature, the second pump is a jet pump disposed in an intermediate portion of a pipe line for guiding the blow-by gas pressurizingly transferred by the first pump to the intake system so that the purge gas is sucked into the second pump using a negative pressure generated by passing the blow-by gas at a high speed. With the third feature, by using a jet pump with a simple structure as the second pump, the size and weight of the second pump can be reduced and reliability in durability of the second pump can be improved.

According to a fourth feature of the present invention, in addition to the second feature, an oil separator is interposed between the first pump and the second pump. With the fourth feature, the oil separator separates the oil mixed in the blow-by gas in the first pump to prevent clogging in the second pump and adhesion of the oil to the intake system, thereby improving reliability of the entire system.

According to a fifth feature of the present invention, in addition to the first feature, a first intake pipe line for guiding the blow-by gas from the crank case and a second intake pipe line having one end connected to the intake system and bypassing the engine body are connected to the intake side of the first pump. With the fifth feature, communication resistance in a communication path of the blow-by gas in the engine body is varied according to the difference in internal structure of the engine body, but by connecting the first intake pipe line for guiding the blow-by gas from the crank case and the second intake pipe line bypassing the engine body to the first pump and by sucking the blow-by gas and new air with the first pump, a flow rate can be easily regulated so that a sufficient amount of gas can be sucked by the first pump despite the difference in the structure of the engine body, and gas for generating a sufficient negative pressure can be pressurizingly transferred by the first pump even if a jet pump is used as the second pump.

According to a sixth feature of the present invention, in addition to the first feature, the first pump is operable in association with and connected to an exhaust-side camshaft. With the sixth feature, in the non-throttle operation in which the amount of intake air is regulated by opening/closing control of the intake valve, there is not a sufficient space on the intake valve side since a control device of the intake valve is disposed on the intake valve side, but a space for disposing a driving system of the first pump can be easily secured by driving the first pump with an exhaust-side camshaft.

According to a seventh feature of the present invention, in addition to the second feature, an oil passage for guiding oil from an oil pump provided on the engine body is connected to the first pump for lubrication of the first pump. With the seventh feature, the oil is supplied to the first pump from an oil pump originally attached to the engine body for supplying the oil to each of lubrication portions of the engine body, so that it is possible to eliminate the need for a new oil-supply source to simplify the structure. Moreover, the original pressure of the oil pump is sufficiently high, so that a sufficient amount of oil can be supplied to the first pump.

According to an eighth feature of the present invention, in addition to the fourth feature, a collection tank is provided for storing oil collected by the oil separator and returning the oil to an oil pan of the engine body. With the eighth feature, the oil separated by the oil separator is returned to the oil pan, so that the oil can be repeatedly used without wasting the engine oil, leading to a good efficiency.

According to a ninth feature of the present invention, there is provided a blow-by gas and purge gas treating device in an intake valve lift variable engine comprising: an engine body; a cylinder head; an intake valve which is disposed in the cylinder head and which is controlled to be open and close so as to regulate the amount of intake air; and an intake system having no throttle valve and connected to the cylinder head, wherein the device comprises a pump for pressurizingly transferring, to the intake system, blow-by gas sucked from a crank case of the engine body and purge gas from a canister. With the ninth feature, since the blow-by gas and the purge gas are sucked and pressurizingly transferred by the pump to the intake system, the blow-by gas and the purge gas can be reliably guided to the intake system even in the non-throttle operation where a negative pressure is not generated in the intake system. Moreover, only one pipe line is provided for guiding the blow-by gas and the purge gas to the intake system, thereby simplifying the line arrangement.

According to a tenth feature of the present invention, in addition to the ninth feature, the pump is a non-lubrication dry pump. With the tenth feature, since the pump is a dry pump, oil removing means such as an oil separator is not required on the downstream side of the pump, thereby greatly simplifying the system.

The above-mentioned object, other objects, characteristics, and advantages of the present invention will become apparent from a preferred embodiment, which will be described in detail below by reference to the attached drawings.

DESCRIPTION OF THE PREFERRED EMBODIMENTS

Figure 1:
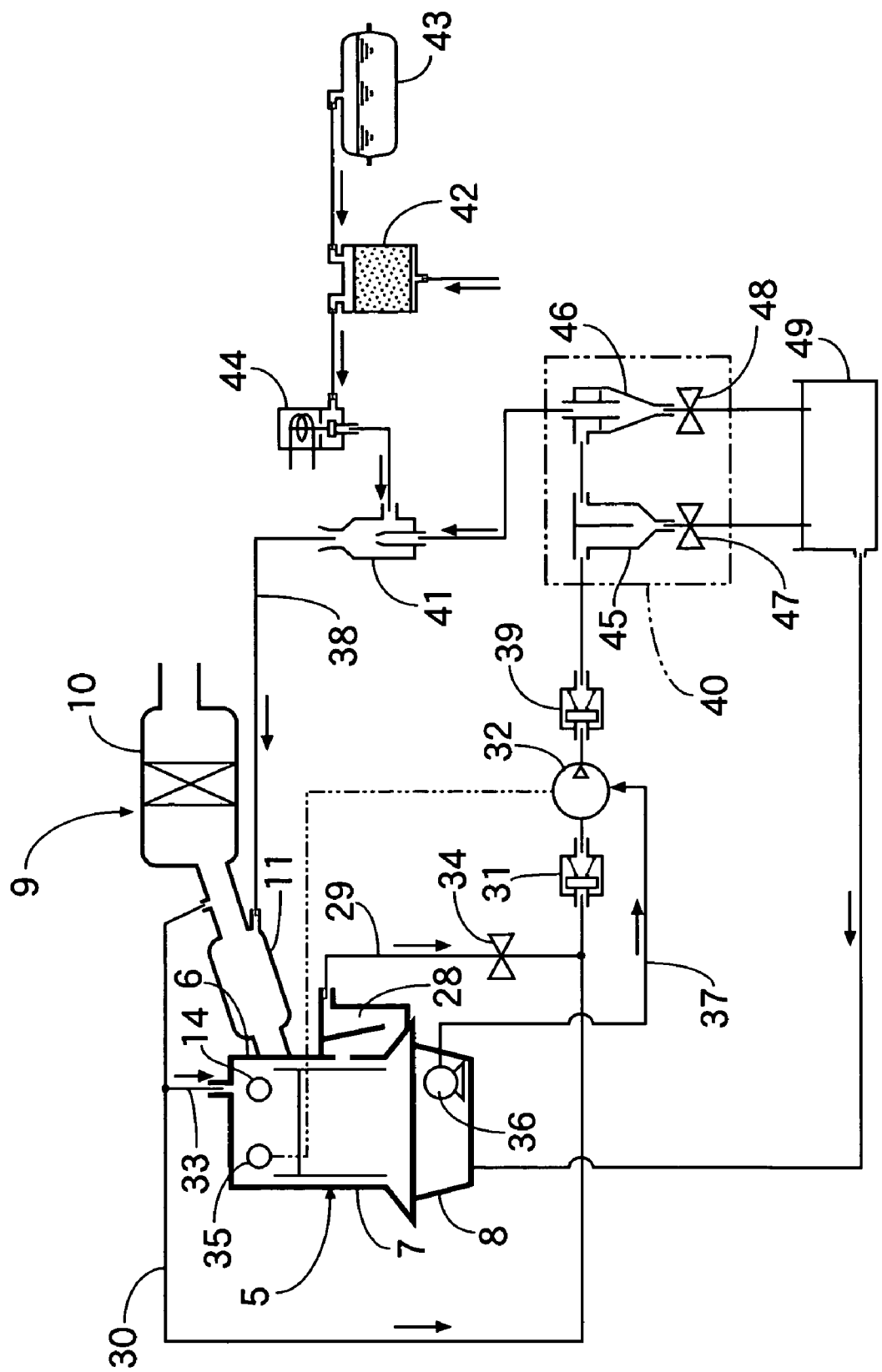
FIG. 1 is a view showing the entire construction of a blow-by gas and purge gas treating device.

A first embodiment of the present invention will be described referring to FIGS. 1 to 3. As shown in FIG. 1, an intake system 9 has an air cleaner 10 for purifying air from the outside and an intake chamber 11 connected to the air cleaner 10 on the downstream side, and is connected to a cylinder head 6 of an engine body 5. No throttle valve is provided in this intake system 9.

Figure 2:
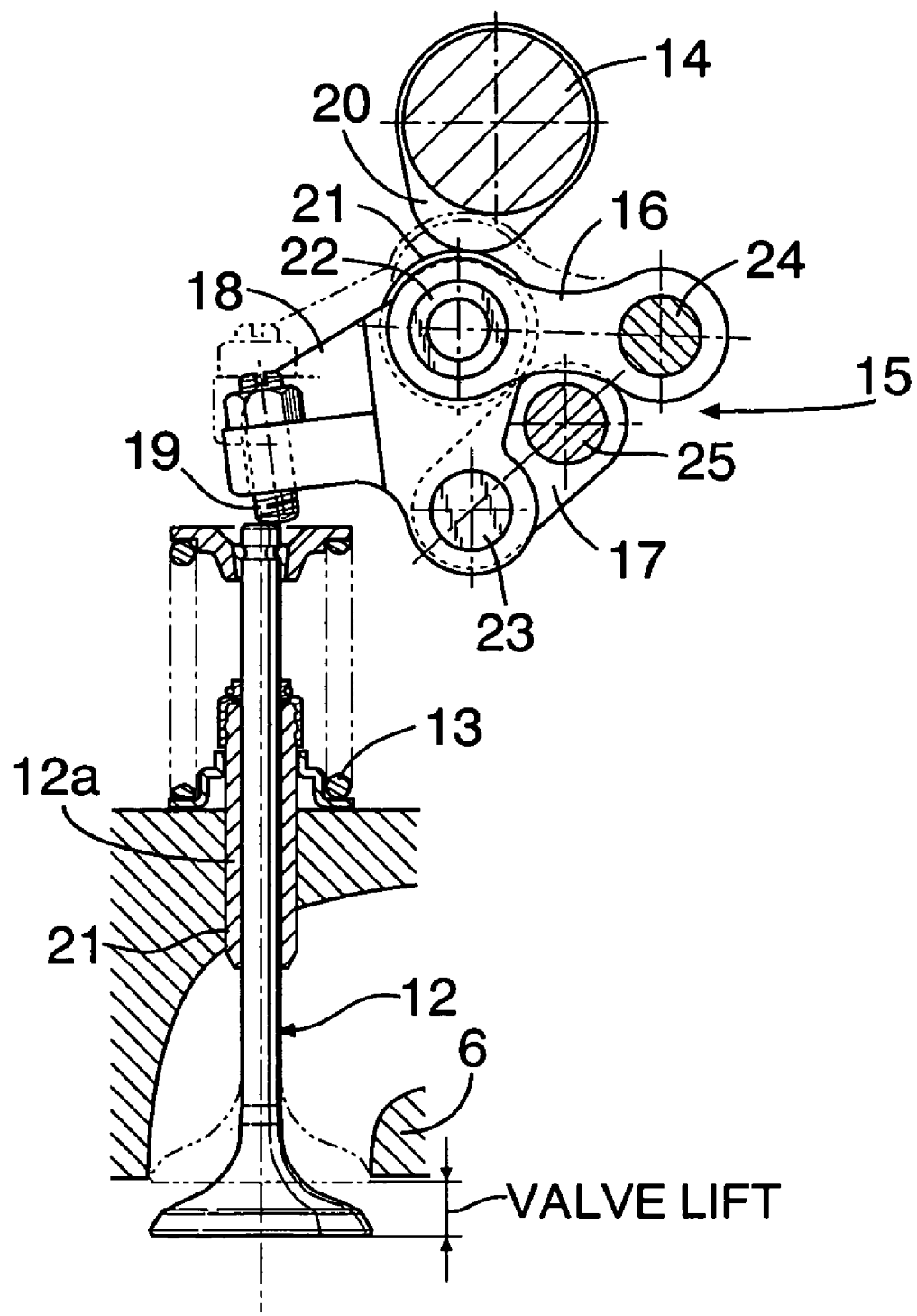
FIG. 2 is a longitudinal sectional side view showing the valve device of an intake valve in the high-lift state.

In FIG. 2, an intake valve 12 is disposed on the cylinder head 6 to be capable of opening/closing operation while being urged by a valve spring 13 in the valve-closing direction, and the intake valve 12 is driven by an intake-side camshaft 14 via a lift variable mechanism 15. The lift variable mechanism 15 has a first link arm 16, a second link arm 17 arranged below the first link arm 16, and a rocker arm 18.

A tappet screw 19 is screwed into one end of the rocker arm 18 to be adjustable in the advanced/retreating positions such that the tappet screw 19 contacts from above with an upper end of a stem 12a in the intake valve 12. Also, a roller 21 rollably contacts with a valve cam 20 provided on the intake-side camshaft 14, and is supported by the other end of the rocker arm 18 via an upper pin 22.

One end of the first link arm 16 is rotatably connected to the other end of the rocker arm 18 via the upper pin 22. Also, one end of the second link arm 17 is rotatably connected to the other end of the rocker arm 18 below the upper pin 22 via a lower pin 23.

The other end of the first link arm 16 is rotatably supported by a rocker shaft 24 fixed to the cylinder head 6, and the other end of the second link arm 17 is rotatably supported by a movable shaft 25. This movable shaft 25 is vertically driven by an actuator which is not shown.

In this lift variable mechanism 15, in a state in which the movable shaft 25 is lifted, when the roller 21 is pressed by the valve cam 20 of the intake-side camshaft 14, a four-joint link connecting the rocker shaft 24, the upper pin 22, the lower pin 23 and the movable shaft 25 is deformed, the rocker arm 18 is oscillated downward from a position shown by a dashed line to a position shown by a solid line, and the tappet screw 19 presses the stem 12a of the intake valve 12, so that the intake valve 12 is opened in the high-lift state.

Figure 3:
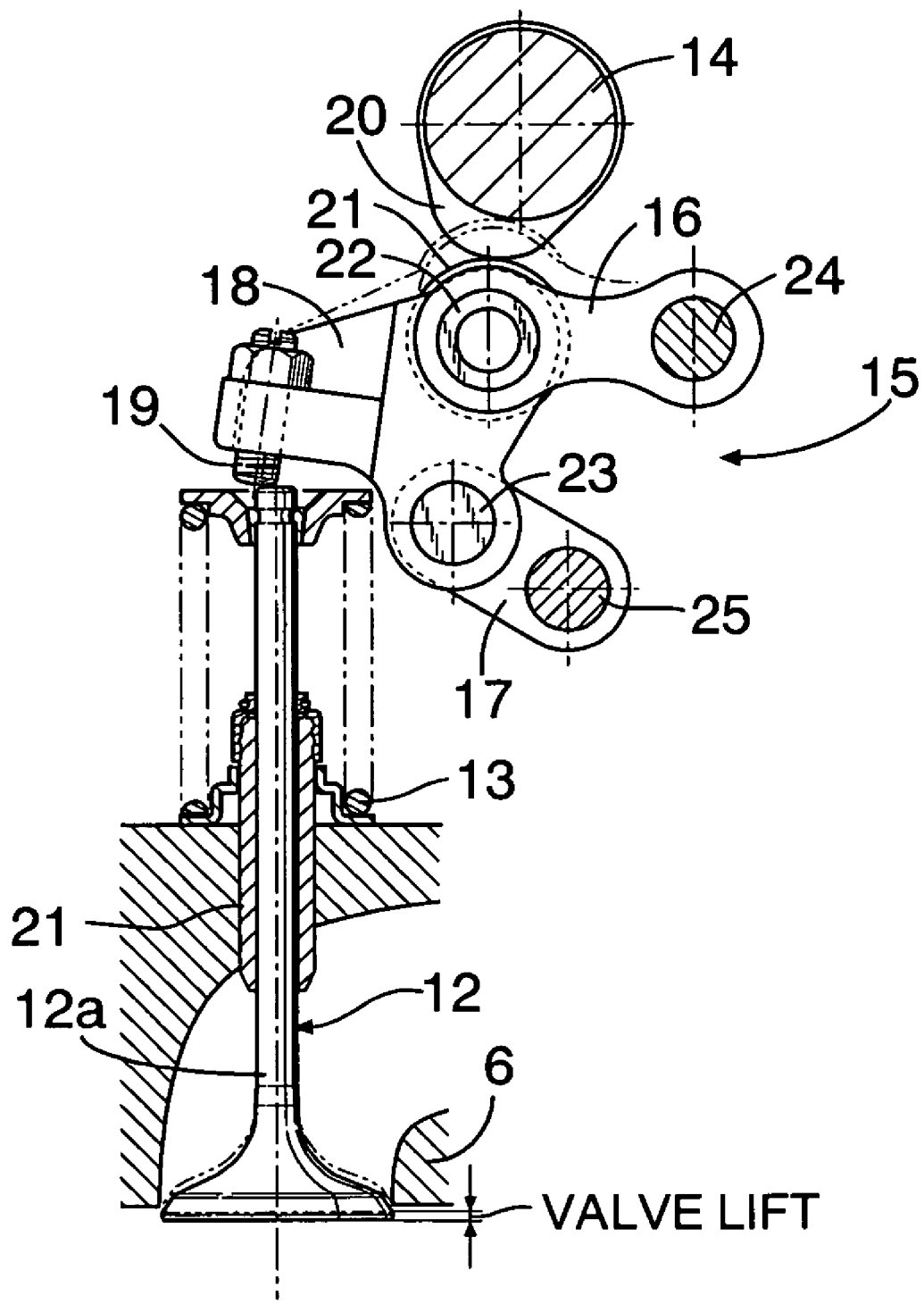
FIG. 3 is a longitudinal sectional side view showing the valve device of an intake valve in the low-lift state.

Also, in a state in which the movable shaft 25 is lowered as shown in FIG. 3, when the roller 21 is pressed by the valve cam 20 of the intake-side camshaft 14, the four-joint link is deformed, the rocker arm 18 is oscillated downward from a position shown by a dashed line to a position shown by a solid line, and the tappet screw 19 presses the stem 12a of the intake valve 12, so that the intake valve 12 is opened in the low-lift state.

In this way, the lift amount of the intake valve 12 can be changed by the lift variable mechanism 15. Since the amount of intake air can be regulated by such a lift amount change of the intake valve 12, it is not necessary any more to provide in the intake system 9 a throttle valve for regulating the amount of intake air.

Returning to FIG. 1, a breather chamber 28 is attached to a crank case 7 of the engine body 5 and one end of a first intake pipe line 29 is connected to the breather chamber 28. In the intake system 9, one end of a second intake pipe line 30 bypassing the engine body 5 is connected to a portion between the air cleaner 10 and the intake chamber 11, and the other ends of the first and the second intake pipe lines 29 and 30 are connected to the intake side of a first pump 32 via an intake-side one-way valve 31. That is, the first pump 32 is capable of sucking the blow-by gas from the crank case 7 of the engine body 5, and also capable of sucking new air from the intake system 9 and immixing it into the blow-by gas.

Further, a branch pipe line 33 branching from an intermediate portion of the second intake pipe line 30 is connected to a top portion of the engine body 5 so that the new air from the intake system 9 can be introduced into the engine body 5. In this embodiment, a control valve 34 for controlling an intake air communication rate is interposed in an intermediate portion of the first intake pipe line 29. However, the control valve 34 may be provided in the second intake pipe line 30, or both in the first and the second intake pipe lines 29 and 30. That is, a control valve for controlling the total amount of intake air sucked by the first pump 32 is provided at least one of the first and second intake pipe lines 29 and 30.

The first pump 32 is a vane pump which is operable in association with and connected to an exhaust side camshaft 35 and which is lubricated with oil. An oil passage 37 is connected to the first pump 32 for lubrication of the first pump 32 such that the oil passage 37 guides oil from an oil pump 36 which is originally provided on the engine body 5 so as to supply oil to each lubrication portions of the engine body 5.

The discharge side of the first pump 32 is connected to the intake chamber 11 of the intake system 9 via a pipe line 38. In this pipe line 38, a discharge-side one-way valve 39, an oil separator 40 and a second pump 41 are sequentially interposed from the first pump 32 side.

The second pump 41 is for immixing the purge gas from a canister 42 into the blow-by gas pressurizingly transferred by the first pump 32. The fuel is evaporated in the fuel tank 43 and adsorbed by the canister 42, and when a purge control valve 44 provided between the second pump 41 and the canister 42 is opened, the evaporated fuel is sucked by the second pump 41 from the canister 42 as purge gas together with external air drawn in from a bottom portion of the canister 42.

The second pump 41 is a jet pump disposed in an intermediate portion of the pipe line 38, and guides the blow-by gas pressurizingly transferred by the first pump 32 to the intake system 9 in such a manner that the purge gas is sucked using a negative pressure generated by passing the blow-by gas at a high speed.

The oil separator 40 interposed in the pipe line 38 between the fist and the second pumps 32 and 41 comprises: a first separator 45 for causing gas including oil from the first pump 32 to collide against a baffle plate and separate the gas; and a centrifugal separation type second separator 46 for separating the oil from the gas received from the first separator 45. Bottom portions of the first and second separators 45 and 46 are connected to a collection tank 49 via opening/closing valves 47 and 48.

That is, the oil separated in the oil separator 40 by opening of the opening/closing valves 47 and 48 is stored in the collection tank 49, and the oil stored in this collection tank 49 is returned to an oil pan 8 provided at the bottom portion of the engine body 5.

Next, operation of the first embodiment will be explained. The blow-bay gas sucked from the crank case 7 is pressurizingly transferred by the first pump 32 to the intake system 9 side, while the purge gas from the canister 42 is mixed by the second pump 41 in the blow-by gas pressurizingly transferred by the first pump 32. Therefore, even during non-throttle operation where a negative pressure is not generated in the intake system 9, the blow-by gas and the purge gas can be reliably guided to the intake system 9. Moreover, only one pipe line 38 is provided for guiding the blow-by gas and the purge gas to the intake system 9, thereby simplifying the line arrangement.

Also, since the first pump 32 is a vane pump lubricated with oil, the sealing performance between the vane and the pump housing can be improved in the first pump 32, whereby the suction/pressurizing-transfer efficiency of the blow-by gas can be improved so as to suck and pressurizingly transfer a large amount of blow-by gas. Moreover, the oil passage 37 for guiding the oil from the oil pump 36 provided on the engine body 5 is connected to the first pump 32 for lubrication of the first pump 32 such that the oil passage 37 guides oil from an oil pump 36 which is originally provided on the engine body 5 so as to supply oil to each lubrication portions of the engine body 5. Therefore, it is possible to eliminate the need for a new oil-supply source to simplify the structure. Moreover, the original pressure of the oil pump 36 is sufficiently high, so that a sufficient amount of oil can be supplied to the first pump 32.

Further, the first pump 32 is operable in association with and connected to the exhaust-side camshaft 35, and when non-throttle operation is performed by regulating the amount of intake air by opening/closing control of the intake valve 12, there is no sufficient space on the intake valve 12 side where a control device of the intake valve 12 is disposed, but by driving the first pump 32 with the exhaust-side camshaft 35, a space for arranging a driving system of the first pump 32 can be easily secured.

Furthermore, the first intake pipe line 29 for guiding the blow-by gas from the crank case 7 and the second intake pipe line 30 having one end connected to the intake system 9 and bypassing the engine body 5 are connected to the intake side of the first pump 32. Therefore, the flow rate can be easily regulated so that a sufficient amount of gas can be sucked by the first pump 32. That is, communication resistance in a communication path of the blow-by gas in the engine body 5 is varied according to the difference in internal structure of the engine body 5, but by sucking the blow-by gas and new air with the first pump 32, the flow rate can be easily regulated so that a sufficient amount of gas can be sucked by the first pump 32 despite the difference in the structure of the engine body 5, and gas for generating a sufficient negative pressure in the second pump 41 which is a jet pump can be pressurizingly transferred by the first pump 32.

On the other hand, the second pump 41 is a jet pump disposed in an intermediate portion of the pipe line 38 for guiding the blow-by gas pressurizingly transferred by the first pump 32 to the intake system 9 so that the purge gas is sucked into the second pump 41 using a negative pressure generated by passing the blow-by gas at a high speed. Therefore, the structure is simple, the size and weight of the second pump 41 can be reduced and reliability in durability of the second pump 41 can be improved.

Also, since the oil separator 40 is interposed between the first pump 32 and the second pump 41, the oil separator 40 separates the oil mixed in the blow-by gas in the first pump 32 to prevent clogging in the second pump 41 and adhesion of the oil to the intake system 9, thereby improving reliability of the entire system.

Further, the collection tank 49 for storing oil collected by the oil separator 40 returns the oil to the oil pan 8 of the engine body 5, so that the oil can be repeatedly used without wasting the engine oil, leading to a good efficiency.

Figure 4:
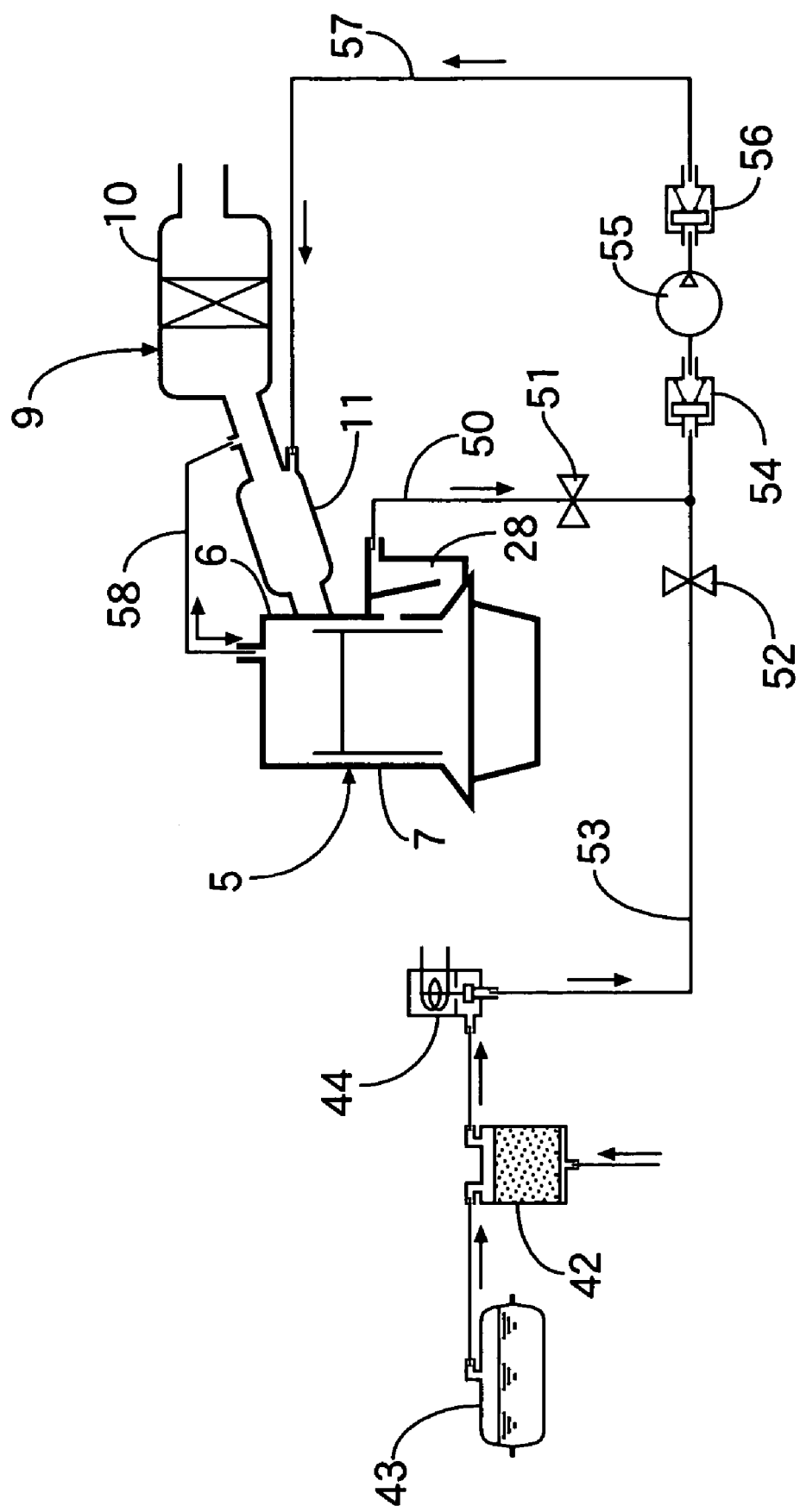
FIG. 4 is a view showing the entire construction of a blow-by gas and purge gas treating device of a second embodiment of the present invention.

A second embodiment of the present invention will be described referring to FIG. 4. It is possible to regulate an amount of intake air by changing a lift amount of the intake valve 12 as in the first embodiment (see the first embodiment), and thus it is not necessary to provide a throttle valve for regulating the amount of intake air in the intake system 9.

Moreover, one end of a first intake pipe line 50 is connected to the breather chamber 28 provided in the crank case of the engine body 5. A control valve 51 is provided at an intermediate portion of the first intake pipe line 50. One end of a second intake pipe line 53 is connected to the purge control valve 44 for discharging as a purge gas the evaporated fuel adsorbed in the canister 42 out of the canister 42 together with external air drawn in from the bottom portion of the canister 42. A control valve 52 is provided at an intermediate portion of the second intake pipe line 53. The other ends of the first and second intake pipe lines 50 and 53 are connected to the intake side of a pump 55 via an intake-side one-way valve 54.

The pump 55 is a non-lubrication dry pump, and its discharge side is connected to one end of a pipe line 57 via a discharge-side one-way valve 56, while the other end of the pipe line 57 is connected to the intake chamber 11 in the intake system 39. That is, the blow-by gas sucked from the crank case 7 of the engine body 5 and the purge gas from the canister 42 are pressurizingly transferred to the intake system 9 by the pump 55.

Also, one end of a communication pipe line 58 is connected to a portion between the air cleaner 10 and the intake chamber 11 in the intake system 9, while the other end of the communication pipe line 58 is connected to a top portion of the engine body 5 so that new air from the intake system 9 is introduced into the engine body 5.

According to this second embodiment, the blow-by gas sucked from the crank case 7 and the purge gas from the canister 42 are pressurizingly transferred to the intake system 9 by the pump 55. Therefore, even in the non-throttle operation where a negative pressure is not generated in the intake system 9, the blow-by gas and the purge gas can reliably be guided to the intake system 9. Moreover, only one pipe line 57 is provided for guiding the blow-by gas and the purge gas to the intake system 9, thereby simplifying the line arrangement.

Also, since the pump 55 is a non-lubrication dry pump, oil removing means such as an oil separator is not required on the downstream side of the pump 55, thereby greatly simplifying the system.

The embodiments of the present invention have been described, but the present invention is not limited to the above embodiments, and various changes in design can be made without deviating from the present invention described in the claims.

For example, in the above embodiments, an intake valve lift variable engine in which the amount of intake air is regulated by continuously varying the lift amount of the intake valve 12, but the present invention is also applicable to an intake valve lift variable engine in which the amount of intake air is regulated by varying a valve-closing timing of the intake valve 12 which is driven to be open and close by a solenoid.

What is claimed is:

1. A blow-by gas and purge gas treating device in an intake valve lift variable engine comprising: an engine body; a cylinder head; an intake valve which is disposed in the cylinder head and which is controlled to be open and close so as to regulate the amount of intake air; and an intake system having no throttle valve and connected to the cylinder head, wherein the device comprises: a canister; a first pump for pressurizingly transferring blow-by gas to the side of the intake system, the blow-by gas being sucked into the first pump; and a second pump for immixing purge gas from a canister into the blow-by gas pressurizingly transferred by the first pump.

2. The blow-by gas and purge gas treating device in an intake valve lift variable engine according to claim 1, wherein the first pump is a vane pump lubricated with oil.

3. The blow-by gas and purge gas treating device in an intake valve lift variable engine according to claim 1 or 2, wherein the second pump is a jet pump disposed in an intermediate portion of a pipe line for guiding the blow-by gas pressurizingly transferred by the first pump to the intake system so that the purge gas is sucked into the second pump using a negative pressure generated by passing the blow-by gas at a high speed.

4. The blow-by gas and purge gas treating device in an intake valve lift variable engine according to claim 2, wherein an oil separator is interposed between the first pump and the second pump.

5. The blow-by gas and purge gas treating device in an intake valve lift variable engine according to claim 1, wherein a first intake pipe line for guiding the blow-by gas from the crank case and a second intake pipe line having one end connected to the intake system and bypassing the engine body are connected to the intake side of the first pump.

6. The blow-by gas and purge gas treating device in an intake valve lift variable engine according to claim 1, wherein the first pump is operable in association with and connected to an exhaust-side camshaft.

7. The blow-by gas and purge gas treating device in an intake valve lift variable engine according to claim 2, wherein an oil passage for guiding oil from an oil pump provided on the engine body is connected to the first pump for lubrication of the first pump.

8. The blow-by gas and purge gas treating device in an intake valve lift variable engine according to claim 4, wherein a collection tank is provided for storing oil collected by the oil separator and returning the oil to an oil pan of the engine body.

9. A blow-by gas and purge gas treating device in an intake valve lift variable engine comprising: an engine body; a cylinder head; an intake valve which is disposed in the cylinder head and which is controlled to be open and close so as to regulate the amount of intake air; and an intake system having no throttle valve and connected to the cylinder head, wherein the device comprises a pump for pressurizingly transferring, to the intake system, blow-by gas sucked from a crank case of the engine body and purge gas from a canister.

10. The blow-by gas and purge gas treating device in an intake valve lift variable engine according to claim 9, wherein the pump is a non-lubrication dry pump.

* * * * *